(12) United States Patent
Nishimura

(10) Patent No.: US 7,461,380 B2
(45) Date of Patent: Dec. 2, 2008

(54) INTER-TASK COMMUNICATIONS METHOD, PROGRAM, RECORDING MEDIUM, AND ELECTRONIC DEVICE

(75) Inventor: Tadaharu Nishimura, Obu (JP)

(73) Assignee: Denso Corporation, Kariya (JP)

( * ) Notice: Subject to any disclaimer, the term of this patent is extended or adjusted under 35 U.S.C. 154(b) by 618 days.

(21) Appl. No.: 10/775,098

(22) Filed: Feb. 11, 2004

(65) Prior Publication Data

US 2004/0163089 A1    Aug. 19, 2004

(30) Foreign Application Priority Data

Feb. 18, 2003   (JP) .............................. 2003-40056

(51) Int. Cl.
  G06F 3/00   (2006.01)
  G06F 9/44   (2006.01)
  G06F 9/46   (2006.01)
  G06F 13/00  (2006.01)
  G06F 13/24  (2006.01)

(52) U.S. Cl. .................... 719/314; 710/263; 718/100

(58) Field of Classification Search .............. 719/312, 719/313–314, 318; 710/263; 718/100
See application file for complete search history.

(56) References Cited

U.S. PATENT DOCUMENTS

| | | | |
|---|---|---|---|
| 5,138,669 A | | 8/1992 | Shimura et al. |
| 5,140,644 A | | 8/1992 | Kawaguchi et al. |
| 5,168,533 A | | 12/1992 | Kato et al. |
| 5,220,625 A | | 6/1993 | Hatakeyama et al. |
| 5,278,984 A | * | 1/1994 | Batchelor .................... 719/314 |
| 5,454,105 A | | 9/1995 | Hatakeyama et al. |
| 5,469,354 A | | 11/1995 | Hatakeyama et al. |
| 5,471,610 A | | 11/1995 | Kawaguchi et al. |
| 5,519,857 A | | 5/1996 | Kato et al. |
| 5,708,814 A | * | 1/1998 | Short et al. .................. 710/260 |

(Continued)

FOREIGN PATENT DOCUMENTS

EP    0741356 A    11/1996

(Continued)

OTHER PUBLICATIONS

Tanenbaum, Operating Systems:Design and Implementation:, 1987, Englewood Cliffs, Prentice Hall, US, pp. 51-76, XP002023005.

(Continued)

*Primary Examiner*—Meng-Ai An
*Assistant Examiner*—Qing-Yuan Wu
(74) *Attorney, Agent, or Firm*—Nixon & Vanderhye P.C.

(57) ABSTRACT

Within a processing of a sender task, a transmission request occurs that a data item be sent to a processing of a recipient task. The data item is then once stored in a queue from which the recipient task can retrieve the data item when the recipient task is thereafter activated. When the data item is stored, it is determined whether the queue already stores another data item. When no another data item is being stored, an activation request for activating the recipient task is outputted to the operating system. When another data item is being stored, no activation request is outputted. Within the processing of the recipient task, all the data items are retrieved from the queue. This decreases the activation/termination of the recipient task, reducing the processing load.

7 Claims, 5 Drawing Sheets

U.S. PATENT DOCUMENTS

| | | | |
|---|---|---|---|
| 5,742,825 A * | 4/1998 | Mathur et al. | 719/329 |
| 5,748,953 A | 5/1998 | Mizutani et al. | |
| 5,757,983 A | 5/1998 | Kawaguchi et al. | |
| 5,758,184 A | 5/1998 | Lucovsky et al. | |
| 5,875,329 A * | 2/1999 | Shan | 719/314 |
| 5,875,343 A * | 2/1999 | Binford et al. | 710/263 |
| 6,085,277 A * | 7/2000 | Nordstrom et al. | 710/263 |
| 6,094,647 A | 7/2000 | Kato et al. | |
| 6,691,175 B1 * | 2/2004 | Lodrige et al. | 719/314 |
| 6,920,635 B1 * | 7/2005 | Lodrige et al. | 719/314 |
| 6,968,552 B2 * | 11/2005 | Nishimura | 718/107 |
| 6,983,462 B2 * | 1/2006 | Savov et al. | 718/104 |
| 7,069,559 B2 * | 6/2006 | Janssen et al. | 719/314 |
| 7,137,122 B2 * | 11/2006 | Gilbert | 719/314 |
| 2002/0023175 A1* | 2/2002 | Karlak | 709/314 |
| 2002/0078257 A1* | 6/2002 | Nishimura | 709/318 |

FOREIGN PATENT DOCUMENTS

| | | |
|---|---|---|
| JP | 1-214941 | 8/1989 |
| JP | 5-303503 | 11/1993 |
| JP | 5-342020 | 12/1993 |
| JP | 6-309180 | 11/1994 |
| JP | 7-295838 | 11/1995 |
| JP | 8-30523 | 2/1996 |
| JP | 10-83313 | 3/1998 |
| JP | 11-65623 | 3/1999 |
| JP | 11-203150 | 7/1999 |
| JP | 3245500 | 10/2001 |

OTHER PUBLICATIONS

Banga et al, "A Scalable and Explicit Event Delivery Mechanism for Unix", Proceedings of the Usenix Annual Technical Conference, Jun. 6-11, 1999, Monterey, CA, USA, Online! Jun. 11, 1999, pp. 1-14, XP002287305.

Tanenbaum, "Operating Systems, Design and Implementation", 1987, Englewood Cliffs, Prentice Hall, US, pp. 80-83, XP002096471.

Japanese Examination Report and English translation dated Aug. 1, 2006.

Excerpts from "Development of µITRON Simulator Using Real-Time Linux", Mar. 2001, pp. 31-38.

EPO Examination Report dated Nov. 22, 2004.

European Search Report dated Jul. 27, 2004.

European Examination Report dated Mar. 28, 2006.

Tanenbaum, Operating Systems:Design and Implementation:, 1987, Englewood Cliffs, Prentice Hall, US, pp. 51-76, XP002023005.

Banga et al, "A Scalable and Explicit Event Delivery Mechanism for UNIX", Proceedings of the Usenix Annual Technical Conference, Jun. 6-11, 1999, Monterey, CA, USA, Online! Jun. 11, 1999, pp. 1-14, XP002287305.

Tanenbaum, "Operating Systems, Design and Implementation", 1987, Englewood Cliffs, Prentice HAll, US, pp. 80-83, XP002096471.

Kylheku, "Re: Select () with Multiple THreads", Newsgroup Message, Online!, Dec. 15, 1999, XP002288053.

* cited by examiner

TO OTHER ECUs

INTER-TASK COMMUNICATIONS METHOD, PROGRAM, RECORDING MEDIUM, AND ELECTRONIC DEVICE

CROSS REFERENCE TO RELATED APPLICATIONS

This application is based on and incorporates herein by reference Japanese Patent Application No. 2003-40056 filed on Feb. 18, 2003.

FIELD OF THE INVENTION

The present invention relates to an inter-task communications method.

BACKGROUND OF THE INVENTION

Conventionally, various inter-task (inter-process) communications methods are known that execute communications (sending-receiving, exchanging, or handing-over) of a message including data between tasks controlled by an RTOS (Real Time Operating System). (For instance, refer to JP-A-2002-189606)

For instance, FIG. 4A shows a flowchart diagram explaining a message transmission processing within a task (or a sub-routine that is invoked by the task) of a sender that is to send a message. FIG. 4B shows a flowchart diagram explaining a data reception/utilization processing within a task (or a sub-routine that is invoked by the task) of a recipient that is to receive a message.

Here, a task of a sender (sender task) refers to TASK A, while a task of a recipient (recipient task) refers to TASK B. TASK B is activated by the RTOS based on the message to utilize the data within the message. TASK A has a priority A, while TASK B has a priority B. The priority A is defined as having a higher priority level than the priority B. The RTOS is designed to follow a scheduling where the RTOS activates the most highly prioritized task among the tasks that are queued in an activation wait queue (Ready Queue) where tasks are waiting for being activated.

For instance, when an occurrence of an event is detected within TASK A, a message communications processing takes place for causing a processing routine for the event within TASK B to process the data relating to the event. The message transmission processing within TASK A, as shown in FIG. 4A, includes two Steps 11, 12. At Step 11, data as a transmission target is queued (or stored) in a queue for TASK B being a recipient of the message. At Step 12, an activation request is then outputted for requesting the RTOS to activate the corresponding recipient TASK B.

Upon receiving the activation request, the RTOS queues, in an activation wait queue, identification information (task ID) for identifying the task that is requested to be activated. Suppose that no more task ID of a task having a higher priority than TASK B exists in the activation wait queue after completion of the processing of TASK A having the priority A. Here, the RTOS activates TASK B based on the task ID being queued in the activation wait queue to execute TASK B.

Within TASK B, the data reception/utilization processing takes place, as shown in FIG. 4B. In detail, at Step 21, the data is retrieved from the queue for its own task, namely, the queue for TASK B. At Step 22, the processing using the retrieved data then takes place. In this way, a given processing within TASK A causes TASK B to be activated to execute a certain processing within TASK B itself. The certain processing within TASK B then retrieves (or receives) and utilizes the data queued by the certain processing within TASK A. For instance, necessary data for a certain event detected within TASK A is transferred and utilized in a processing routine for the certain event within TASK B.

In the above-mentioned conventional inter-task communications method, when a message is sent within TASK A multiple times from TASK A to TASK B having a lower priority level than TASK A, the message transmission processing is repeated multiple times, as shown in FIG. 4A. Further, suppose that each of the messages sent multiple times includes an individual data item.

Therefore, the data items corresponding to the respective messages sent multiple times are queued in a queue for TASK B, while an activation request for requesting for activating TASK B is queued multiple times in an activation wait queue (Ready Queue) of the RTOS. Thereafter, when no more task (or processing, interruption) having a higher priority than TASK B exists, a series of processings for delivering messages repeats to takes place multiple times. This series of processings includes the following: (1) Activation processing for activating TASK B by RTOS; (2) Data reception processing within TASK B (Step 21); (3) Data utilization processing using the received data within TASK B (Step 22); and (4) Termination processing for terminating TASK B.

For instance, FIG. 5 explains a processing flow of a message communications between tasks. Here, the routine for all of the processing shown in FIG. 4A refers to SEND MESSAGE FUNCTION, while the routine for the processing only at Step 21 shown in FIG. 4B refers to RECEIVE MESSAGE FUNCTION. Both the functions are included as sub-routines in an event service. Via the event service, three messages having Data A, Data B, and Data C, respectively, are sent from TASK A to the event processing routine within TASK B to cause the event processing routine within TASK B to perform based on Data A, Data B, and Data C. This event service can be provided as a portion within the RTOS, or a portion (sub-routine) within the respective tasks. In addition, the processing by the event service is assumed to be performed with the same priority level as an originating party that invokes the event service.

As shown in FIG. 5, as SEND MESSAGE FUNCTION of the event service is invoked within TASK A, Data A is transferred as an argument, to the event service. The event service then queues, within this SEND MESSAGE FUNCTION, Data A in the queue for TASK B, which corresponds to Step 11 in FIG. 4A. The event service then outputs an activation request for activating TASK B to the RTOS, which corresponds to Step 12 in FIG. 4A. Based on this activation request, the RTOS queues the task ID of TASK B in the activation wait queue. Further, TASK A transfers Data B to the event service by repeating to invoke SEND MESSAGE FUNCTION. The service then queues Data B in the queue for TASK B (Step 11) to output an activation request for TASK B to the RTOS (Step 12). Based on this activation request, the RTOS queues the task ID of TASK B in the activation wait queue. Yet further, TASK A transfers Data C to the event service by repeating to invoke SEND MESSAGE FUNCTION. The service then queues Data C in the queue for TASK B (Step 11) to output an activation request for TASK B to the RTOS (Step 12). Based on this activation request, the RTOS queues the task ID of TASK B in the activation wait queue. When the entire processings of TASK A is terminated, the RTOS takes over the sequence.

The RTOS refers to the activation wait queue to activate a task corresponding to the task ID having the highest priority level within the queue. Namely, the RTOS activates the tasks corresponding to the task IDs within the activation wait queue in a descending order of a priority level, i.e., from the highest to the lowest priority level. Here, suppose that there are, in the activation wait queue, no more tasks whose task IDs have higher priority levels than that of TASK B. Since the task IDs of TASK B are queued in the activation wait queue, TASK B is thereby activated (the uppermost "SCHEDULE" in FIG. 5). Here, two task IDs of TASK B still remain in the queue. In the processing within TASK B activated, RECEIVE MESSAGE FUNCTION is invoked from the event service. The event service retrieves, as the processing of RECEIVE MESSAGE FUNCTION, Data A queued for TASK B, which corresponds to Step 21 in FIG. 4B. The event service then transfers Data A to TASK B. TASK B performs processing using Data A retrieved from the event service, which corresponds to Step 22 in FIG. 4B. As the entire other processings of TASK B are terminated, the RTOS takes over the sequence. The RTOS refers to the activation wait queue to activate tasks in the descending order of the priority level. Here, since two task IDs of TASK B are queued in the activation wait queue, TASK B is thereby activated. Here, the single task ID of TASK B still remains in the activation wait queue. In the processing within TASK B activated, RECEIVE MESSAGE FUNCTION is invoked from the event service. The event service retrieves Data B queued for TASK B (Step 21), to transfer Data B to TASK B. TASK B performs processing using Data B retrieved from the event service (Step 22). As the entire other processings of TASK B are terminated, the RTOS takes over sequence. The RTOS refers to the activation wait queue to activate tasks in the descending order of the priority level. Here, since the single task ID of TASK B is queued in the activation wait queue, TASK B is thereby activated, which vacates the activation wait queue. In the processing within TASK B activated, RECEIVE MESSAGE FUNCTION is invoked from the event service. The event service retrieves Data C queued for TASK B (Step 21) to transfer Data C to TASK B. TASK B performs processing using Data C retrieved from the event service (Step 22). As the entire other processings of TASK B are terminated, the RTOS takes over the sequence.

In the above, within the sender task (TASK A), a message is transmitted multiple times to the recipient task (TASK B) without returning the sequence to the RTOS. By contrast, within the recipient task of TASK B, a series of processings occurs every single message. This series of processings includes the activation/termination processing (processings in the RTOS [e.g., processing for SCHEDULEs in FIG. 5]) and processing (e.g., determining processing for transferring to the processing shown in FIG. 4B). This increases a processing load in the processing unit (e.g., CPU).

SUMMARY OF THE INVENTION

It is an object of the present invention to provide an inter-task communications method capable of decreasing a processing load in a processing unit.

To achieve the above object, an inter-task communications method is provided with the following. When a transmission request occurs that a data item be sent from a processing of a sender (first) task to a processing of a recipient (second) task, a data queuing is executed within the processing of the sender task. The data item is thereby stored in a queue from which the recipient task can retrieve the data item. An activation request is then outputted to an operating system for requesting for activating the recipient task. When the recipient task is activated by a processing of the operating system based on the activation request, a data retrieval is executed within the processing of the recipient task. The data item stored in the queue is retrieved from the queue. Here, within the processing of the sender task a frequency of the activation request is provided for being less than a frequency of the data queuing. Within the data retrieving within the processing of the recipient task, more than one data item is retrieved from the queue.

For instance, the sender task outputs a single activation request for activating the recipient task with respect to the multiple transmission requests. By contrast, the recipient task is only activated based on the single activation request to retrieve the multiple data items from the queue. This suppresses a problem of increasing a processing load of a processing unit resulting from a conventional method where the activation and termination of the recipient task takes place each time a single data item (e.g., message) is sent.

In another aspect of the present invention, an inter-task communications method is provided with the following. When a transmission request occurs that a data item be sent from a processing of a sender (first) task to a processing of a recipient (second) task, a data queuing is executed within the processing of the sender task. The data item is thereby stored in a queue from which the recipient task can retrieve the data item. An activation request is then outputted to an operating system for requesting for activating the recipient task. When the recipient task is activated by a processing of the operating system based on the activation request, a data retrieving is executed within the processing of the recipient task. The data item stored in the queue is retrieved from the queue. Here, when a transmission request that a given data item be sent occurs, it is determined whether the queue stores a certain data item that is being already stored before the given data item is to be stored. When the certain data item is being already stored, no activation request is then outputted. When no certain data item is being already stored, an activation request is then outputted. Within the data retrieving within the processing of the recipient task, all data items that can be retrieved from the queue are retrieved from the queue.

Here, when the sender task sends the data items (e.g., messages) continuously to the processing of the recipient task, the activation request for requesting for activating the recipient task can be once outputted. This suppresses a problem of increasing a processing load of a processing unit resulting from a conventional method where the activation and termination of the recipient task takes place each time a single data item (e.g., message) is sent.

In yet another aspect of the present invention, an inter-task communications method is provided with the following. When a transmission request occurs that a data item be sent from a processing of a sender (first) task to a processing of a recipient (second) task, a data queuing is executed within the processing of the sender task. The data item is thereby stored in a queue from which the recipient task can retrieve the data item. An activation request is then outputted to an operating system for requesting for activating the recipient task. When the recipient task is activated by a processing of the operating system based on the activation request, a data retrieving is executed within the processing of the recipient task. The data item stored in the queue is retrieved from the queue. Here, when a transmission request occurs, it is determined whether the activation request for requesting for activating the recipient task is present in the operating system. When the activation request is present in the operating system, no activation request for requesting for activating the recipient task is outputted. When no activation request is present in the operating system, an activation request for requesting for activating the recipient task is then outputted. Within the data retrieving within the processing of the recipient task, all data items that can be retrieved from the queue is retrieved from the queue.

Here, when the sender task sends the data items (e.g., messages) continuously to the processing of the recipient task, the activation request for requesting for activating the recipient task can be once outputted. This suppresses a problem of increasing a processing load of a processing unit resulting from a conventional method where the activation and termination of the recipient task takes place each time a single data item is sent (e.g., message).

In particular, when the operating system executes the tasks in a descending order of the priority level based on the priority levels of the tasks, all the tasks are preferably assigned the individual priority level to, and the queue is preferably provided for each of the priority levels. This structure can manage the tasks and queue based on the priority. For instance, when a given message is sent, it is determined whether a certain message that is waiting for transmission and has the same priority level as the given message is present or not. When the certain message is present, no activation request for the task corresponding to the given message is outputted. Only when the certain message is not present, an activation request for the task corresponding to the given message is then outputted. In addition, whether the message is present or not can be determined based on whether a message is already present in the queue corresponding to the same priority level as the given message. Further, whether the message is present or not can be also determined based on whether an activation request for the corresponding task is already present in the queue corresponding to the same priority level as the given message. Thereafter, within the data retrieving within the processing of the recipient task, when any message is present in the queue corresponding to the priority level, all the messages in the queue are retrieved. This structure decreases the activation and termination of the recipient task, resulting in decreasing a processing load of the processing unit when the sender task continuously detects the multiple transmission requests and the recipient task has the same or lower priority level than the sender task.

Further, the above-mentioned inter-task communications method can be provided as a program that enables a computer to execute them. For instance, this program can be recorded in a computer readable medium such as a flexible disk, a magnetic optical disk, a CD-ROM, an HDD, a ROM, or a RAM and executed by being loaded and activated in the computer system as needed. Further, this program can be executed by being loaded and activated via a communications network. Yet further, the program and a computer executing the program can be combined as an electronic device. This electronic device can decrease the activation and termination of the task by the computer (processing unit), so that it can assign more processing time to processing that achieves a device's original function.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
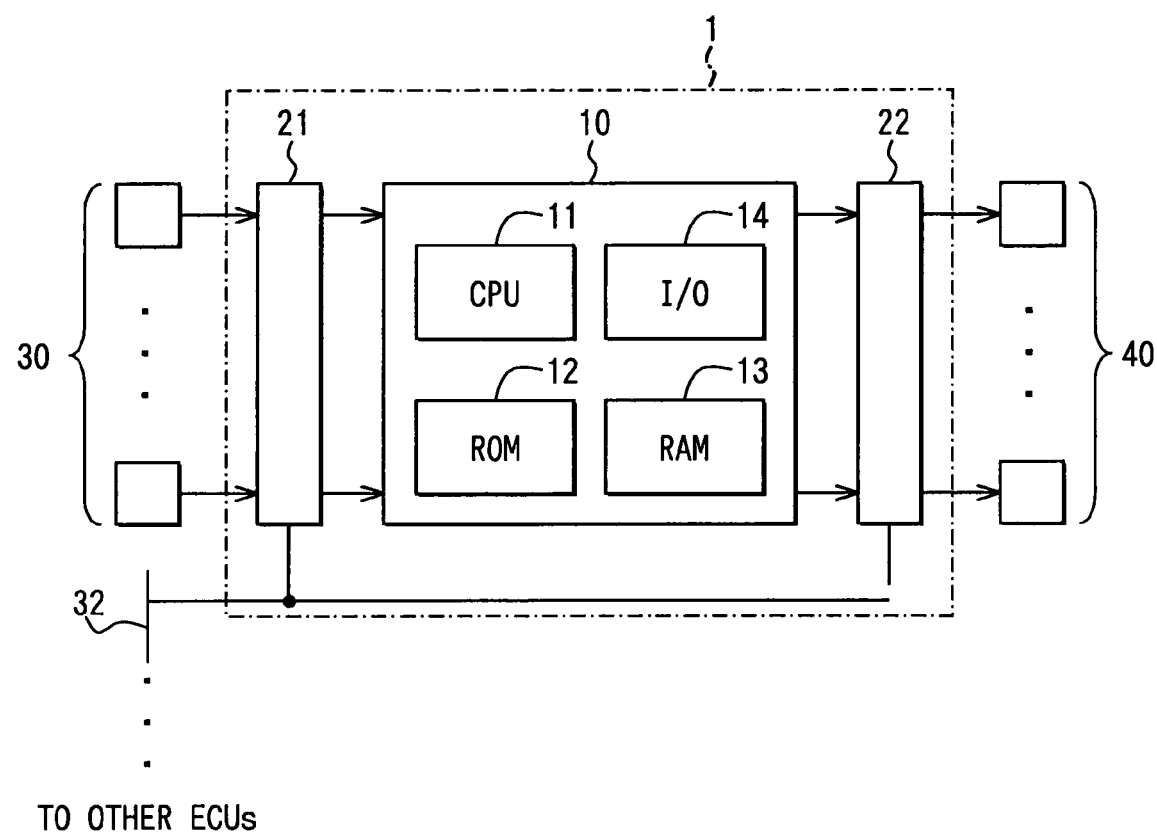
FIG. 1 is a diagram of a structure of an engine control unit as a processing unit according to an embodiment of the present invention.

An embodiment of the present invention will be explained with reference to the drawings. A structure of an engine control unit (ECU) 1 as an electronic device according to the embodiment is shown in FIG. 1.

The ECU 1 includes an input circuit 21, a micro-computer 10, and an output circuit 22. The input circuit 21 receives signals from various sensors 30 for detecting various operating states of an engine to perform waveform shaping or analog/digital conversion. The various sensors 30 include as follows: a rotation angle senor for outputting pulse signals each time an engine crank axis rotates by a given angle; a base position sensor for outputting pulse signals when a specific cylinder piston of the engine reaches a given position (e.g., top dead center [TDC]); a water temperature sensor for detecting a temperature of cooling water of the engine; and an oxygen concentration sensor for measuring an oxygen concentration. The input circuit 21 further receives signals from an in-vehicle local area network (LAN) 32. The micro-computer 10 performs various processings for controlling the engine based on the inputted signals via the input circuit 21. The micro-computer 10 further performs various processings for receiving the data from other ECUs via the in-vehicle LAN 32 and for generating and sending data to other ECUs. Based on the data from the micro-computer 10, the output circuit 22 drives actuators such as an injector and igniter that are disposed in the engine and moreover outputs the data to the in-vehicle LAN 32.

The micro-computer 10 includes as follows: a known CPU 11 for executing a program; a ROM 12 for storing the program executed by the CPU 11; a RAM 13 for storing results computed by the CPU 11; an I/O 14 for exchanging the signals with the input circuit 21 or output circuit 22; and various registers or free-run counters, etc. (not shown).

The ECU 1 performs communication processing and engine control processing. The communication processing is for communicating with other ECUs by controlling the input and output circuits 21, 22 via the in-vehicle LAN 32. The engine control processing is for driving the actuators connected with the output circuit 22 based on the inputted signals via the input circuit 21 from the sensors 30 or the in-vehicle LAN 32.

Next, a structure of an engine control program stored in the ROM 12 will be explained below. Here, this specification, includes descriptions such as "a task does (executes) . . . ," "RTOS does (executes) . . . ," "an event service task does (executes) . . . ," or "function does (executes) . . . ." These are expressions where each program acts as a subject, but in fact the CPU 11 executes these programs stored in the ROM 12. The engine control program includes tasks for an RTOS (Real Time Operating System), TASK A, TASK B, TASK C, etc. and an event service. The event service includes SEND MESSAGE FUNCTION of a sub-routine for message transmission processing for the respective tasks, and RECEIVE MES- SAGE FUNCTION of a sub-routine for data reception processing for the respective tasks. The individual tasks have their own priority levels. The functions or sub-routines of the event service are executed based on the priority level possessed by an original party invoking the corresponding program.

The RAM 13 includes a storing area for queues for the tasks. The queues are buffers of FIFO (First In First Out).

For instance, suppose that an event occurs within a given routine (or processing) of TASK A and the event needs to be handled in a certain routine (or processing) within TASK B. Here, data needs to be sent from the given processing within TASK A to the certain processing within TASK B. The given processing within TASK A thereby designates the data to be sent as an argument to invoke SEND MESSAGE FUNCTION of the event service.

Figure 2A:
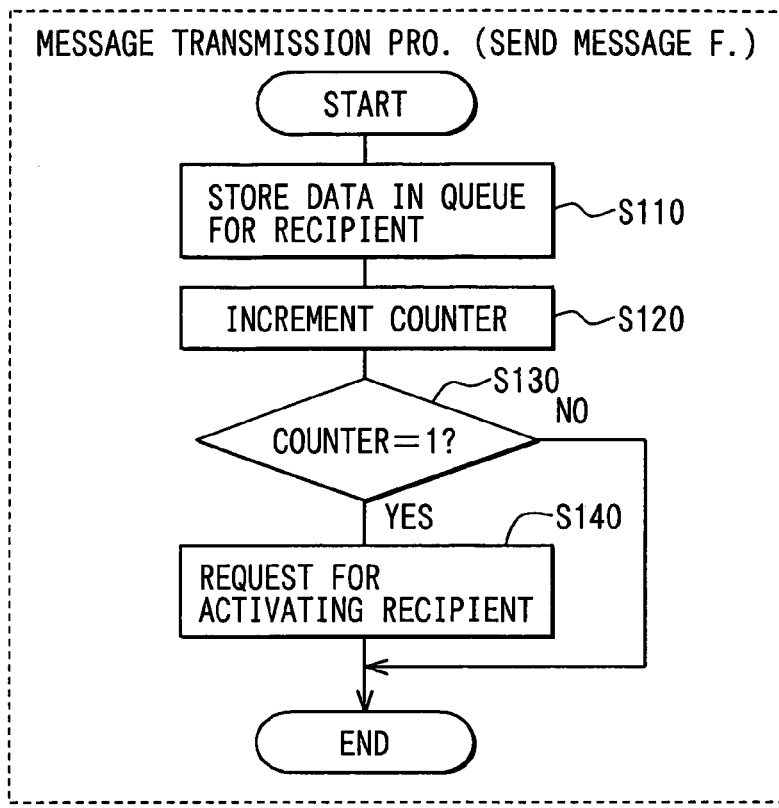
FIG. 2A is a flowchart diagram explaining a message transmission processing according to the embodiment.

The processing of SEND MESSAGE FUNCTION of this event service will be explained with reference to FIG. 2A. At first, the data of a transmission target received (e.g., via stack) as an argument is stored (or queued) in a queue for a recipient task (i.e., recipient task queue, queue for TASK B, TASK B queue) at Step 110.

A message counter for the recipient task queue is then incremented at Step 120. A message counter for each task queue is initialized to "0" at initializing processing of the RTOS.

Next, it is determined whether the message counter for the recipient task queue is equal to "1" at Step 130. When the counter is determined to be "1" (S130: YES), the processing proceeds to Step 140. Here, an activation request for activating the recipient task is outputted to the RTOS. Upon receiving the activation request, the RTOS stores (or queues), in an activation wait queue, identification information (task ID) for identifying the task requested to be activated. In detail, the task ID of TASK B is queued in the activation wait queue. SEND MESSAGE FUNCTION terminates its processing and TASK A takes over the sequence.

Here, that the message counter for the recipient task queue is "1" means that the data of the transmission target data is stored in the recipient task queue for the first time. Only in this case, the activation request for activating the recipient task is then outputted to the RTOS. Thereafter, when the data of the transmission target is additionally queued, no more additional activation request is then outputted.

After the sequence returns from SEND MESSAGE FUNCTION of the event service, TASK A executes other processing within TASK A. When TASK A completes the processing, TASK A informs the RTOS of its termination (or hands over the sequence to the RTOS) to be terminated. The RTOS then activates (or hands over the sequence to) the task whose task ID has the highest priority level among the task IDs queued in the activation wait queue. Namely, the RTOS activates the tasks corresponding to the task IDs in a descending order of priority levels (from the highest to the lowest priority level) of the task IDs queued in the activation wait queue. Next, the processing posterior to activation of the recipient task will be explained below.

Figure 2B:
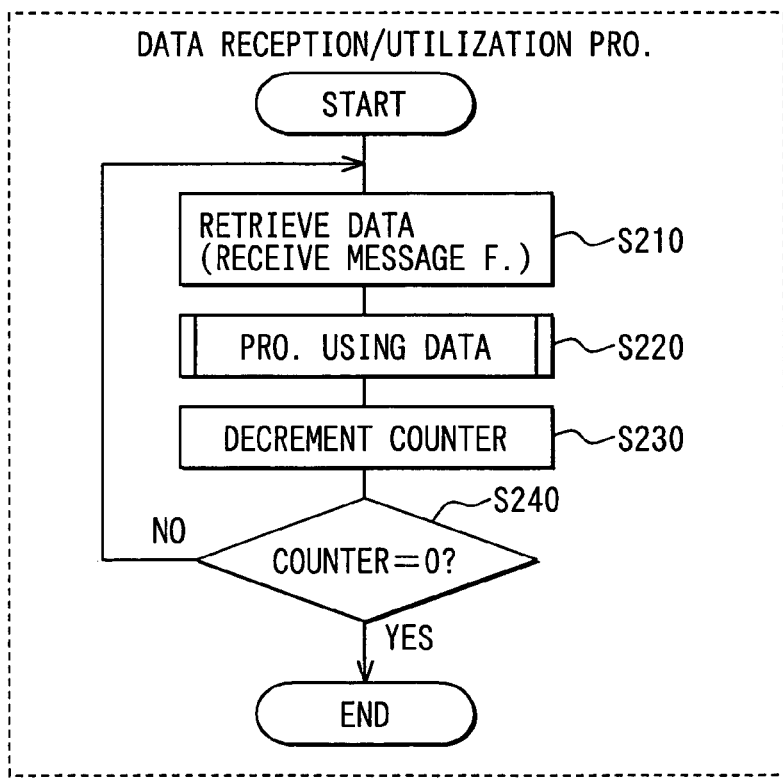
FIG. 2B is a flowchart diagram explaining a data reception processing according to the embodiment.

Within this recipient task (TASK B), the data reception/utilization processing takes place, as shown in FIG. 2B. At first, at Step 210, the data is retrieved from the own task queue (queue for TASK B). Here, RECEIVE MESSAGE FUNCTION of the event service is invoked from TASK B. In the processing within RECEIVE MESSAGE FUNCTION, the data queued in the queue for TASK B is retrieved and handed over to TASK B. At Step 220, TASK B then executes the processing using the data handed over. At Step 230, the message counter for TASK B queue is decremented. At Step 240, it is determined whether the message counter is equal to "0." When the counter is determined to be not "0," the processing returns to Step 210, repeating the processing from Step 210 to Step 240. By contrast, when the counter is determined to be "0," the processing of the data reception/utilization is terminated. TASK B notifies the RTOS of its termination or hands over the sequence to the RTOS, to be terminated.

Thus, the recipient task (TASK B) is activated from the processing within the sender task (TASK A) and then executes the processing within the own task. In this processing within the recipient task, the data queued within the processing within the sender task is retrieved to be utilized. For instance, given necessary data for executing the event detected within TASK A can be transferred to the routine of processing the event within TASK B.

Figure 3:
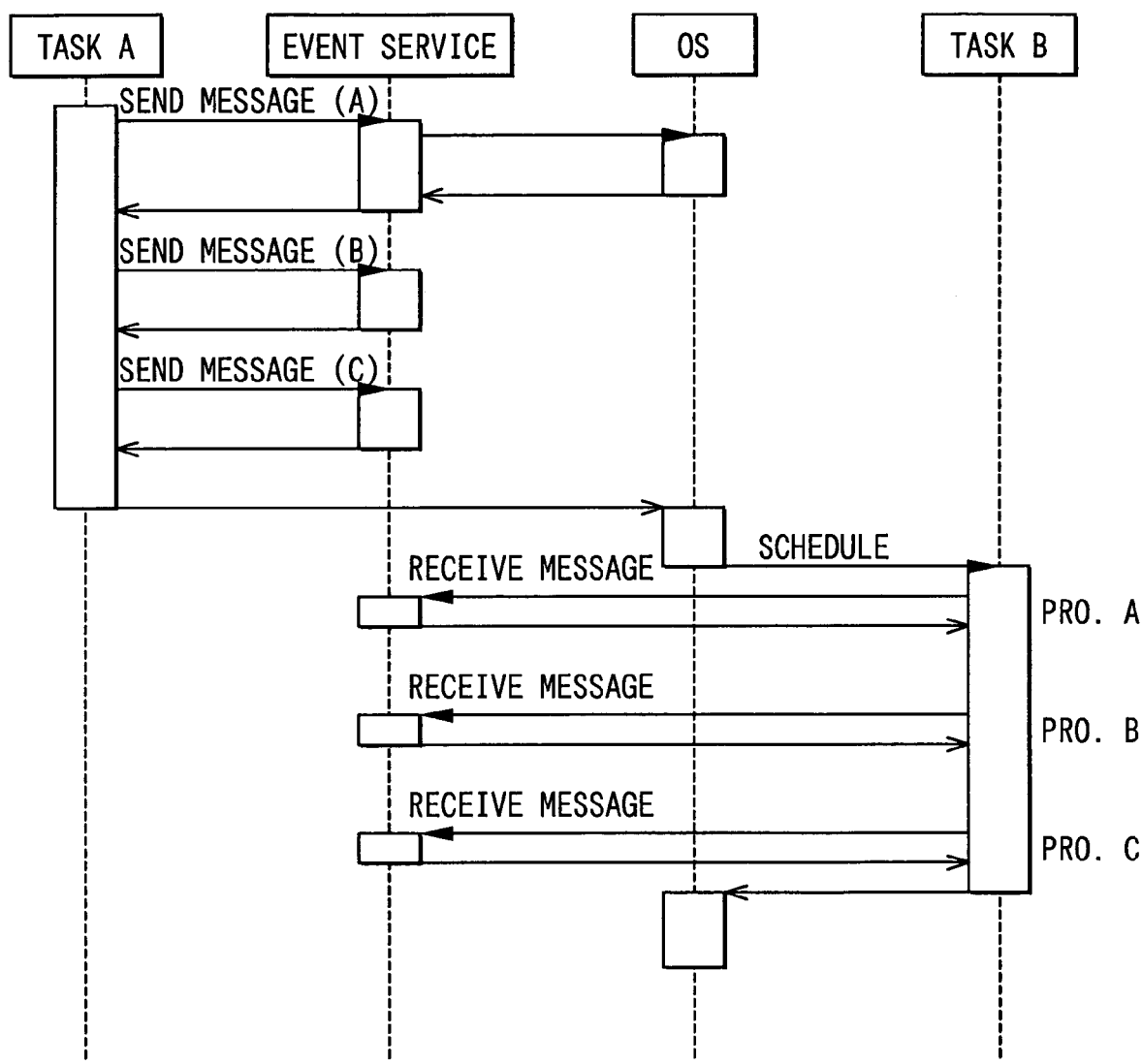
FIG. 3 is a diagram showing processing where TASK A sends a message to TASK B three times in an inter-task communications method according to the embodiment.
Figure 4A:
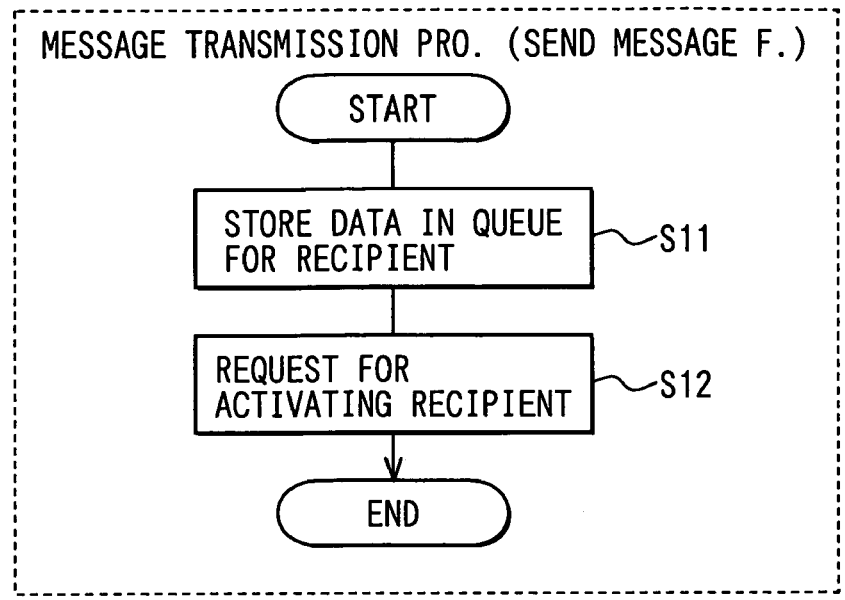
FIG. 4A is a flowchart diagram explaining a message transmission processing of a related art.
Figure 4B:
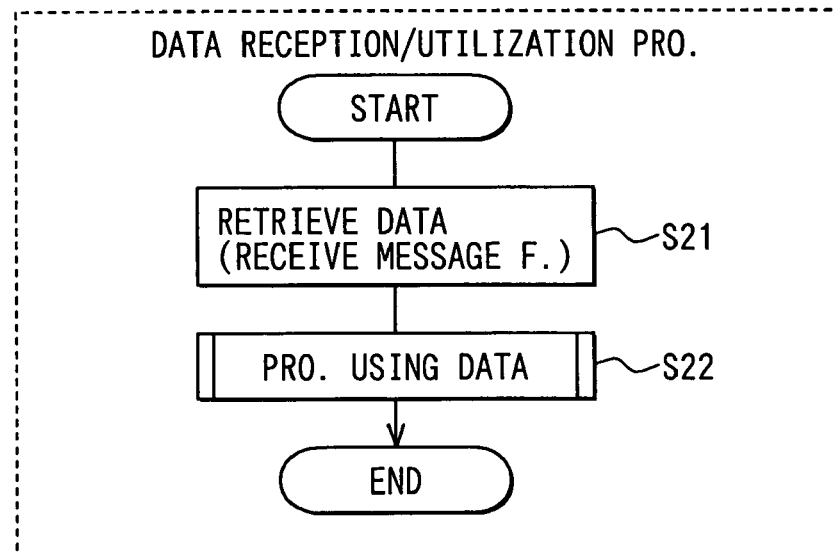
FIG. 4B is a flowchart diagram explaining a data reception processing of the related art.

An instance will be explained with reference to FIG. 3 where a message is outputted continuously three times from TASK A to TASK B. As shown in FIG. 3, SEND MESSAGE FUNCTION of the event service is invoked from the processing within TASK A, while data A is handed over as an argument to the event service. The event service queues the data A in the queue for TASK B within this function (equivalent to Step 110 in FIG. 2A). A message counter for TASK B queue is then incremented at Step 120. As a result, as the message counter becomes "1" (Step 130: YES), an activation request for activating TASK B is outputted to the RTOS (Step 140). Based on this activation request, the RTOS stores a task ID for TASK B in the activation wait queue. TASK A then hands over data B to the event service by invoking again SEND MESSAGE FUNCTION. The event service queues the data B in the queue for TASK B (Step 110) to increment the message counter for TASK B queue. As a result, the message counter becomes "2," and the sequence returns to TASK A (Step 130: NO). In detail, as shown in FIG. 3, when the data B being the second data is stored in the queue, no more additional activation request is outputted. TASK A furthermore hands over data C to the event service by invoking further again SEND MESSAGE FUNCTION. The event service queues the data C in the queue for TASK B (Step 110) to increment the message counter for TASK B queue. As a result, the message counter becomes "3," and the sequence returns to TASK A (Step 130: NO). In detail, as shown in FIG. 3, when the data C being the third data is stored in the queue, no more additional activation request is outputted. TASK A terminates its entire processing to hand over the sequence to the RTOS.

The RTOS refers to the activation wait queue to activate the task whose ID has the highest priority among the task IDs queued in the activation wait queue. Here, suppose that there are, in the activation wait queue, no more tasks whose task IDs have higher priority levels than that of TASK B. In the activation wait queue, the task ID of TASK B is queued, so that TASK B is activated (SCHEDULE in FIG. 3). The activation wait queue is thereby vacated. In the processing within TASK B activated, RECEIVE MESSAGE FUNCTION of the event service is invoked. The event service retrieves the data A queued in the queue for TASK B (corresponding to Step 210 in FIG. 2B) in the processing of RECEIVE MESSAGE FUNCTION to hand over the data A to TASK B. TASK B then executes the processing using the data A handed over (Step 220). Since the message counter for TASK B queue becomes "2," the determination at Step 240 returns the sequence to Step 210. RECEIVE MESSAGE FUNCTION of the event service is invoked again. The event service retrieves the data B queued in the queue for TASK B (Step 210) in the processing of RECEIVE MESSAGE FUNCTION to hand over the data B to TASK B. TASK B then executes the processing using the data B handed over (Step 220). Since the message counter for TASK B queue becomes "1," the determination at Step 240 returns the sequence to Step 210. RECEIVE MESSAGE FUNCTION of the event service is invoked yet again. The event service retrieves the data C queued in the queue for TASK B (Step 210) in the processing of RECEIVE MESSAGE FUNCTION to hand over the data C to TASK B. TASK B then executes the processing using the data C handed over (Step 220). Since the message counter for TASK B queue eventually becomes "0," the sequence exits from the data reception/utilization processing (Step 240: YES) to be handed over to another processing within TASK B. Thereafter, as all the processings within TASK B is completed, the sequence is returned to the RTOS.

Figure 5:
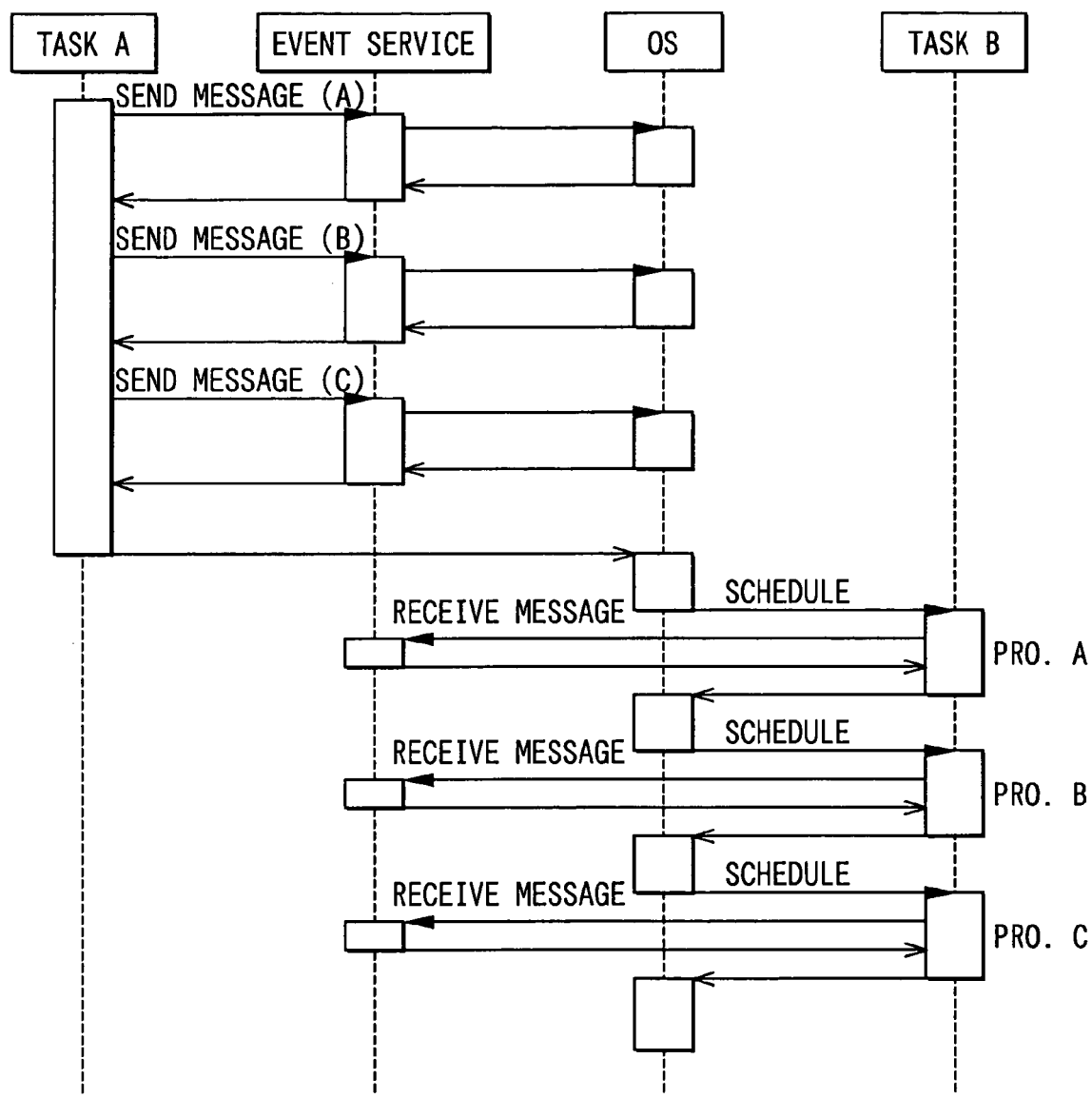
FIG. 5 is a diagram showing processing where TASK A sends a message to TASK B three times in an inter-task communications method of the related art.

Conventionally, as shown in FIG. 5, the activation/termination of TASK B is repeated as many times (three times) as the transmission of the message, so that the processing has a large overhead. By contrast, in this embodiment, as shown in FIG. 3, the activation/termination of TASK B is performed only once, so that the overhead can be decreased, enabling relief of processing load of the CPU 11.

In particular, in this engine control of the embodiment, a message is exchanged between tasks (inter-task communications or inter-process communications) in the requesting processing such as an asynchronous injection request, a diagnosis processing request, or a communications processing request. The asynchronous injection request is for adding fuel by detecting a rapid increase of a required torque based on a signal inputted from the sensor 30. The diagnosis processing request is for storing, in a memory for diagnosis, an abnormality detected in a signal from the sensor 30. The communications processing request is for responding to incoming communications data via the in-vehicle LAN 32 (e.g., CAN) from an external node. The inter-task communications explained in the embodiment is used in the case where a processing of a sender (i.e., TASK A) detecting a request has a different priority level from a processing of a recipient (i.e., TASK B). Further, it can be used for simplifying exclusive processing of the resource of a recipient when a single reception processing is performed correspondingly to the multiple transmission processings having the individually different priority levels.

Each of these messages is sent each time each request is detected, so that multiple recipient tasks enter wait states in the following cases:

Multiple transmission processings are executed continuously within a single task having a high priority level and the respective transmission conditions are effected. (For instance, a determination of an asynchronous injection and detection of an abnormality are executed every 4 milli-seconds.)

Multiple tasks having high priority levels are continuously executed and each transmission condition within each of the multiple tasks is effected. (For instance, a reception interruption of CAN overlaps with an asynchronous injection determination taking place every 4 milli-seconds.)

Multiple messages are continuously transmitted from a single transmission processing (by a single transmission condition). (For instance, an abnormality detection processing every 4 milli-seconds detects multiple sensor abnormalities.)

In these just-above cases, the processing of the embodiment of the present invention enables relief of the processing load of the CPU 11, resulting in prevention of deteriorating controllability during the high rotation rate of an engine.

In this embodiment, it is assumed that the data is sent from the processing within TASK A to the processing within TASK B. However, for instance, the data can be also sent from the processing within TASK A by being assigned its destination to. For instance, a recipient task can be designated by an argument of SEND MESSAGE FUNCTION. Designating the recipient task is executed by assigning the task ID to the argument. Here, in the processing from Step 110 to Step 140, "queue for TASK B" is replaced with "queue corresponding to a task ID received as an argument." Further, for instance, when all the priority levels have the individually unique priority levels, designating the recipient task can be executed by using the respective priority levels as the arguments. Here, queues are provided for the respective priority levels instead of the respective tasks. In the processing from Step 110 to Step 140, "queue for TASK B" is thereby replaced with "queue corresponding to a priority level received as an argument." Namely, after transmission data is queued within a message transmission processing, whether the message having a certain priority level is present or not is determined based on a message transmission counter of the corresponding certain priority level. When the message is not present, an activation request for the corresponding task is sent to an RTOS similarly with the conventional processing. By contrast, when the message is present, no more additional activation request is sent, terminating the processing. Thereafter, when the RTOS activates the recipient task, the data queued is retrieved and used in the subsequent processing using the data. Further, it is determined whether a message having the certain priority level is still present. When the message is present, the processing repeats to proceed to the subsequent reception processing till the message becomes absent. This structure meets a case where the multiple transmission requests of the messages having the same certain priority levels are outputted continuously and the recipient task has the same certain priority level or a lower priority level than the certain priority level of the sender task. In this case, the activation/termination of the task can be also decreased, enabling reduction of the processing load of the CPU 11.

Further, in this embodiment, whether a message is an initial one or not is determined based on the message counter, but it can be also determined based on presence of the task ID of the recipient task in the activation wait queue in the RTOS. Namely, the processing of Steps 120, 230 are not executed. In addition, the processing of Step 130 in FIG. 2A is replaced with a determination whether the task ID of TASK B is present in the activation wait queue. Here, when the task ID is not present (Step 130: YES), the processing at Step 140 is executed. When the task ID is present (Step 130: NO), the processing at Step 140 is skipped without being executed for the processing to be terminated. Furthermore, the processing at Step 240 is replaced with a determination whether data is present in the queue for TASK B or not. Here, when the data is present (Step 240: NO), the processing proceeds to Step 210. When the data is not present (Step 240: YES), the sequence exits from the data reception processing.

It will be obvious to those skilled in the art that various changes may be made in the above-described embodiments of the present invention. However, the scope of the present invention should be determined by the following claims.

What is claimed is:

1. An inter-task communications method achieved by execution of a computer, the inter-task communications method where a transmission request occurs, wherein the transmission request is that a data item be sent from a processing of a first task to a processing of a second task, the inter-task communications method comprising steps of:

executing, when the transmission request occurs, within the processing of the first task, a data queuing so that the data item is stored in a queue from which the second task can retrieve the data item;

outputting an activation request to an operating system for requesting activation of the second task; and executing, when the second task is activated by a processing of the operating system based on the activation request, a data retrieving within the processing of the second task so that the data item stored in the queue is retrieved from the queue, wherein, when a transmission request that a given data item be sent occurs, it is determined whether the queue stores a certain data item that is being already stored before the given data item is to be stored, wherein, when the certain data item is being already stored before the given data item is to be stored, no activation request is then outputted, wherein, when no certain data item is being already stored before the given data item is to be stored, an activation request is then outputted, and wherein, within the data retrieving within the processing of the second task, all data items that can be retrieved from the queue is retrieved from the queue.

2. The inter-task communications method of claim 1, wherein the second task is one of a plurality of tasks that individually have different priority levels, wherein the queue is provided for each of the priority levels, wherein the operating system includes task specifying information that specifies a task, wherein an activation request for activating the task specified by the specifying information is already outputted to the operating system and activating the task specified by the specifying information is yet to be executed, and wherein the operating system activates, in a descending order of the priority levels, the tasks specified by the task specifying information.

3. An inter-task communications method achieved by execution of a computer, the inter-task communications method where a transmission request occurs, wherein the transmission request is that a data item be sent from a processing of a first task to a processing of a second task, the inter-task communications method comprising steps of:

executing, when the transmission request occurs, within the processing of the first task, a data queuing so that the data item is stored in a queue from which the second task can retrieve the data item;

outputting an activation request to an operating system for requesting activation of the second task; and executing, when the second task is activated by a processing of the operating system based on the activation request, a data retrieving within the processing of the second task so that the data item stored in the queue is retrieved from the queue, wherein, when a transmission request occurs, it is determined whether a given activation request for requesting for activating the second task is present in the operating system, wherein, when the given activation request is present in the operating system, no given activation request for requesting for activating the second task is then outputted, wherein, when no given activation request is present in the operating system, the given activation request for requesting for activating the second task is then outputted, and wherein, within the data retrieving within the processing of the second task, all data items that can be retrieved from the queue is retrieved from the queue.

4. A computer program product on a computer readable medium for use in an inter-task communications where a transmission request occurs, wherein the transmission request is that a data item be sent from a processing of a first task to a processing of a second task, the computer program product comprising instructions of:

executing, when the transmission request occurs, within the processing of the first task, a data queuing so that the data item is stored in a queue from which the second task can retrieve the data item;

outputting an activation request to an operating system for requesting activation of the second task; and executing, when the second task is activated by a processing of the operating system based on the activation request, a data retrieving within the processing of the second task so that the data item stored in the queue is retrieved from the queue, wherein, when a transmission request that a given data item be sent occurs, it is determined whether the queue stores a certain data item that is being already stored before the given data item is to be stored, wherein, when the certain data item is being already stored before the given data item is to be stored, no activation request is then outputted, wherein, when no certain data item is being already stored before the given data item is to be stored, an activation request is then outputted, and wherein, within the data retrieving within the processing of the second task, all data items that can be retrieved from the queue is retrieved from the queue.

5. A computer program product on a computer readable medium for use in an inter-task communications where a transmission request occurs, wherein the transmission request is that a data item be sent from a processing of a first task to a processing of a second task, the computer program product comprising instructions of:

executing, when the transmission request occurs, within the processing of the first task, a data queuing so that the data item is stored in a queue from which the second task can retrieve the data item;

outputting an activation request to an operating system for requesting activation of the second task; and executing, when the second task is activated by a processing of the operating system based on the activation request, a data retrieving within the processing of the second task so that the data item stored un the queue is retrieved from the queue, wherein, when a transmission request occurs, it is determined whether a given activation request for requesting for activating the second task is present in the operating system, wherein, when the given activation request is present in the operating system, no given activation request for requesting for activating the second task is then outputted, wherein, when no given activation request is present in the operating system, the given activation request for requesting for activating the second task is then outputted, and wherein, within the data retrieving within the processing of the second task, all data items that can be retrieved from the queue is retrieved from the queue.

6. An electronic device achieving an inter-task communications where a transmission request occurs, wherein the transmission request is that a data item be sent from a processing of a first task to a processing of a second task, the electronic device comprising:

a computer; and a program executed by the computer, wherein the program includes steps of:

executing, when the transmission request occurs, within the processing of the first task, a data queuing so that the data item is stored in a queue from which the second task can retrieve the data item;

outputting an activation request to an operating system for requesting activation of the second task; and executing, when the second task is activated by a processing of the operating system based on the activation request, a data retrieving within the processing of the second task so that the data item stored in the queue is retrieved from the queue, wherein, when a transmission request occurs, it is determined whether a given activation request for requesting for activating the second task is present in the operating system, wherein, when the given activation request is present in the operating system, no given activation request for requesting for activating the second task is then outputted, wherein, when no given activation request is present in the operating system, the given activation request for requesting for activating the second task is then outputted, and wherein, within the data retrieving within the processing of the second task, all data items that can be retrieved from the queue is retrieved from the queue.

7. An electronic device achieving an inter-task communications where a transmission request occurs, wherein the transmission request is that a data item be sent from a processing of a first task to a processing of a second task, the electronic device comprising:

a computer; and a program executed by the computer, wherein the program includes steps of:

executing, when the transmission request occurs, within the processing of the first task, a data queuing so that the data item is stored in a queue from which the second task can retrieve the data item;

outputting an activation request to an operating system for requesting activation of the second task; and executing, when the second task is activated by a processing of the operating system based on the activation request, a data retrieving within the processing of the second task so that the data item stored in the queue is retrieved from the queue, wherein, when a transmission request that a given data item be sent occurs, it is determined whether the queue stores a certain data item that is being already stored before the given data item is to be stored, wherein, when the certain data item is being already stored before the given data item is to be stored, no activation request is then outputted, wherein, when no certain data item is being already stored before the given data item is to be stored, an activation request is then outputted, and wherein, within the data retrieving within the processing of the second task, all data items that can be retrieved from the queue is retrieved from the queue.

* * * * *